Sept. 8, 1942.　　　K. G. VANIMAN　　　2,295,438
TIRE CASING VULCANIZER
Filed June 30, 1939　　　2 Sheets-Sheet 1

INVENTOR.
KENNETH G. VANIMAN
BY Charles R. Werner
ATTORNEY.

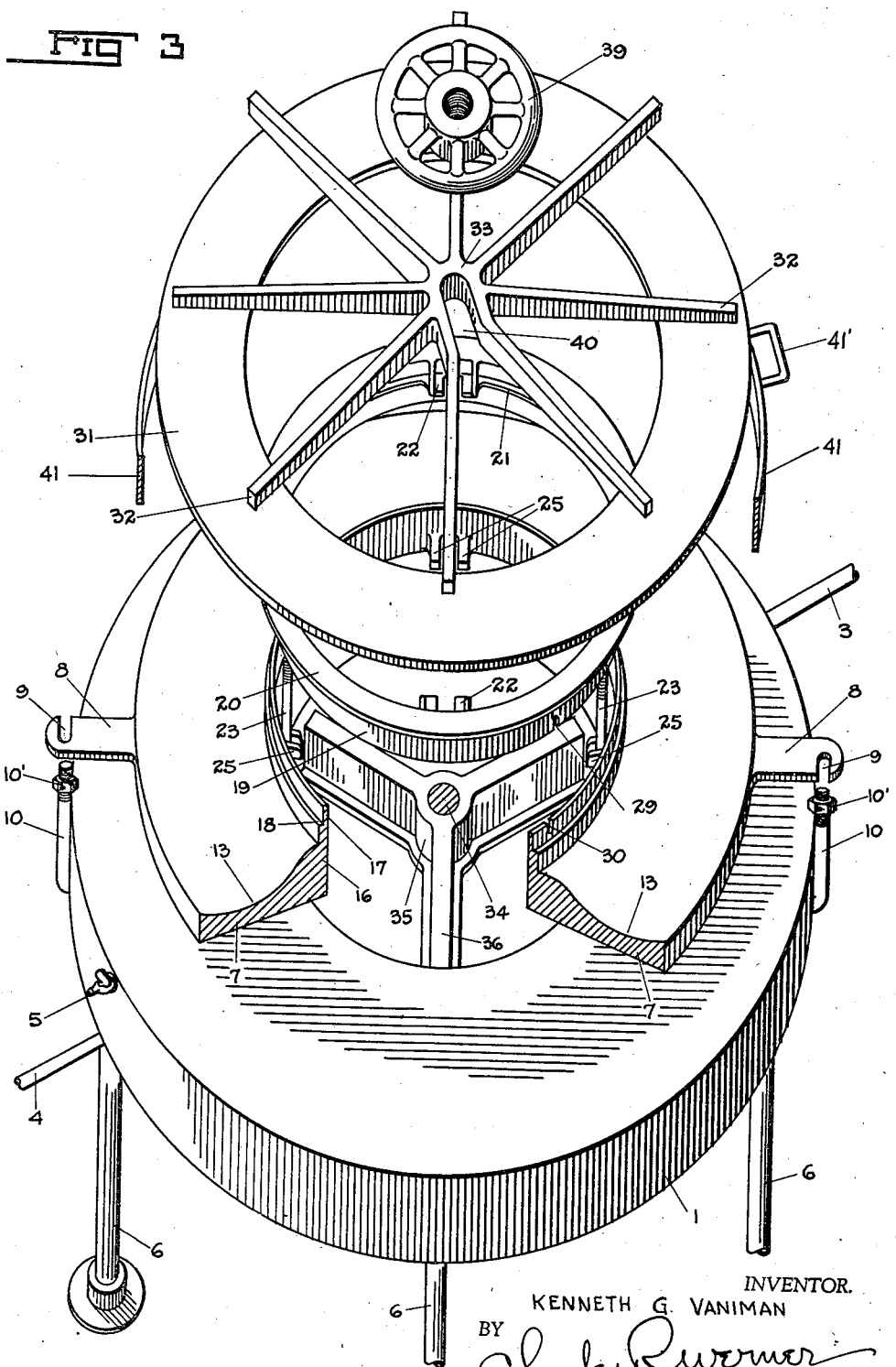

Patented Sept. 8, 1942

2,295,438

UNITED STATES PATENT OFFICE 2,295,438

TIRE CASING VULCANIZER

Kenneth G. Vaniman, Wichita, Kans.

Application June 30, 1939, Serial No. 282,233

4 Claims. (Cl. 18—18)

This invention relates in general to tire casing vulcanizers and in particular to a machine for vulcanizing an entire circular side wall of a tire casing to apply a colored side wall to new or used casings or to repair damaged side walls.

As far as I am aware there is nothing in the prior art which is designed solely for the application, in one operation, of an entire colored side wall to a tire casing. Segmental side wall vulcanizers have been provided but these cannot perform the function of my invention.

One of the primary objects of the invention is to provide a simple, inexpensive, side wall vulcanizing device which will efficiently and rapidly perform its function, that of vulcanizing a complete side wall at one operation, and turn out a smooth, neat appearing product.

The second object is to provide a device of the class described in which the tire casing to be vulcanized may be quickly and easily applied to the matrix and the casing retaining members may be expeditiously secured in proper position.

Third, to provide means for forcing and securely holding the bead of the tire casing against the side wall against the side wall matrix.

Fourth, to provide means for applying pressure against one of the side walls to force the other side wall against the side wall matrix.

Fifth, to provide a tread band for preventing distortion of the tread portion of the casing upon application of internal pressure in said casing.

Further objects and advantages, as well as the construction and operation of my invention, will be better understood by reference to the following specifications in connection with the accompanying drawings, in which:

Fig. 3 is a disassociated view of the device showing the various parts thereof, the tire casing being omitted.

Figure 1:
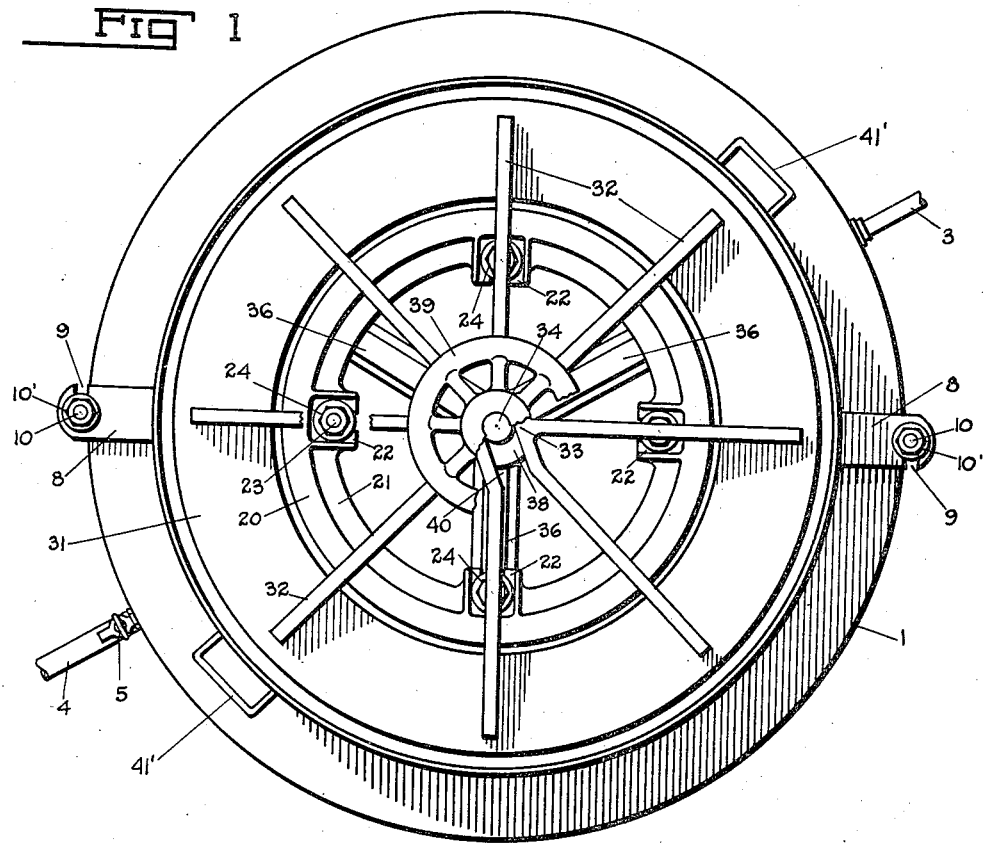
Fig. 1 is a top plan view of my device, parts being broken away to better illustrate certain other parts.
Figure 2:
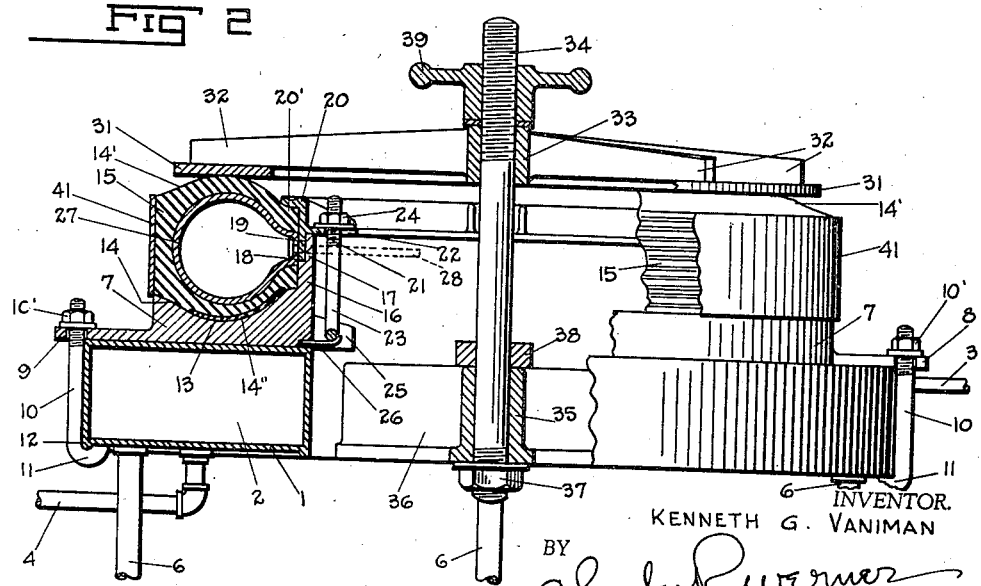
Fig. 2 is a vertical view of my invention, partly in elevation and partly in section, showing a tire casing in side wall vulcanizing position.

Referring now to the drawings by numerals of reference, 1 designates a steam table having a chamber 2 into which live steam may be introduced through steam inlet 3, a steam outlet 4 and test or relief petcock 5 being provided. Suitable legs 6 may support the steam table.

The top of the steam table is preferably flat as shown to receive the circular side wall matrix 7, provided with ears or lugs 8, having slotted openings 9 in which bolts 10 are received, nuts 10' being provided to securely hold the circular matrix 7 in fixed relation to the steam table, the lower end of the bolts 10 being hook shaped as shown at 11 to engage the bead 12 on steam table 1.

The top surface of the matrix 7 is curved as shown at 13 to correspond to the configuration of the side wall 14 of the casing 15. The inner circumference of the matrix 7 is provided with an upstanding annular flange 16 and a further upstanding, reduced annular flange 17, providing an annular shoulder 18. On this shoulder 18 is adapted to rest the depending annular flange 19 of circular bead retaining rim 20, a reenforcing annular web 21 extending inwardly from the flange 19.

The rim 20 carries a plurality of slotted lugs 22 in which bolts 23 and nuts 24 may be received. The lower end of bolts 23 may be pivotally supported in lugs 25 on the matrix 7. Springs 26 or any other suitable means may be used to retain the bolts 23 in engagement with the lugs 25.

A pressure bag 27 is inserted in the casing 15 and the casing laid on the matrix 7, the stem 28 of the bag 27 passing through slotted opening 29 in the flange 19 of the bead rim 20 and through slotted opening 30 in the flange 17.

A circular side wall pressure ring 31 is adapted to rest against the upper side wall 14' of the casing 15 and pressure thereto may be applied by means of a spider 32 having central hub 33 through which passes shaft or standard 34, the lower end of which passes through hub 35 of spider 36 formed integral with steam table 1, a nut 37 engaging shaft 34 and in conjunction with a collar 38 fixed to the shaft 34, preventing endwise and rotative movement of the shaft. The upper end of the shaft 34 which passes through hub 35 threadedly engages handwheel 39. The hub 33 of the spider 32 is provided with a slot 40 whereby the spider may be slid into engagement with the shaft 34, obviating the necessity of removing the handwheel and raising and lowering the spider on the shaft. A circular tread engaging or restraining ring 41 is provided as shown and used as hereinafter set forth.

In the operation of my invention it is first necessary to prepare the tire casing for the application of the colored side wall. In working with either new or used casings, the side wall is buffed to remove any raised letters or indicia and to leave a uniformly rough surface to receive a coating of rubber cement which is applied after the buffing operation. This cement is permitted to dry until it is of the proper "tackiness" to receive the raw rubber. The raw rubber 14", which may be of any desired thickness, is firmly pressed onto the side wall by hand, certain tools used along the edges to "stitch" them down firmly and the entire coating of raw rubber "rolled" to evenly seat same against the cemented side wall, covering the entire circular surface thereof.

When thus prepared and with a pressure bag 27 inserted in the casing 15, said casing is laid on the matrix 7 with the raw rubber face down on the curved surface 13 and the stem passing through slots 29 and 30.

The circular bead retaining rim 20 is laid on the tire bead 20' and bolts 23 with nuts 24 swung upward into lug 22 engaging position and the nuts 24 turned down until the bottom of flange 19 engages shoulder 18. At this time the tire beads will be in correct relation to each other, it being understood that a separate matrix and bead rim are used for each size tire being vulcanized. The matrix and rim are not adjustable.

To prevent distortion of the tread portion of the casing 15, the tread ring 41, of predetermined diameter, is placed about the tread and held in place merely by the snug fit. This ring is also non-adjustable and a separate ring is used for each different size tire being vulcanized.

At this time the side wall pressure ring 31 may be rested on the upper side wall 14' and the spider 32 slid into shaft engaging position, the hand wheel 39 already in threaded engagement with the shaft 34, is rotated until the ring 31 has been forced against the casing 15 a predetermined amount.

Pressure may then be applied to the tube or bag 27 in the tire casing. It has been found that approximately 135 pounds of air is a suitable pressure. With pressure applied to the casing, steam may be supplied to the steam table, a temperature of approximately 300° F., having been found suitable. The casing is subjected to this heat and pressure for a period of about thirty minutes at which time the coating of raw rubber 14" is properly vulcanized to the casing.

The casing may be easily removed from the vulcanizing machine and the side wall buffed or otherwise dressed to present a smooth finished product. While the device has been designed primarily for the application of colored side walls to new or used casings it is obvious that it may be used for repairing of side walls or other related operations.

It is also obvious that double steam chambers and side wall matrices may be provided to simultaneously vulcanize both side walls.

I do not wish to be limited to the exact form of my invention shown since changes in form, proportion and minor details of construction may be resorted to without departing from the spirit of my invention.

What I claim as new and desire to secure by Letters Patent is:

1. In a vulcanizing device for side walls of tire casings, a circular matrix for one side wall of the casing, a matrix heating means positioned under the matrix, means for removably securing the tire casing in the matrix, tire tread restraining means, means for applying pressure against the side wall of the casing opposite the matrix, said last named means comprising an annular member resting on the side wall of the casing opposite the matrix, a spider resting on the annular member, said spider including a central hub, a shaft securely anchored to said heating means and passing through said central hub, said hub being slotted to permit the spider to be transversely slidable with respect to the shaft, and a screw member threadedly engaging the shaft and adapted to force said spider and annular member downwardly against the side wall opposite the matrix.

2. In a vulcanizing device for side walls of tire casings, a circular matrix for one side wall of the casing, a matrix heating means positioned under the matrix, means for removably securing the tire casing in the matrix, tire tread restraining means, means for applying pressure against the side wall of the casing opposite the matrix, said pressure applying means including an annular plate, a pressure distributing member on the plate, a shaft on which the pressure distributing member is received, screw means on the shaft for exerting pressure on the distributing member, and a slot radiating from the center of the pressure distributing member in which the shaft is received, whereby the pressure distributing member may be transversely removed from the shaft without removal of the screw means from said shaft.

3. In a vulcanizing device for side walls of tire casings, an annular matrix for one side wall of the casing extending from one bead to the tread thereof, a heating means underlying the matrix, an upstanding annular bead retaining rim on said matrix, a reduced upstanding annular portion on said bead retaining rim providing an annular shoulder above said bead retaining rim, tire bead retaining means including a rim adapted to slidably engage the outer peripheral surface of the reduced upstanding annular portion on said first mentioned bead retaining rim, securing means for said bead retaining means adapted to draw said second mentioned rim down about the reduced portion of the first mentioned rim into close contact with the annular shoulder, and including bifurcated lugs on said second mentioned rim, and bolts pivotally mounted in the matrix for upward swinging into said lugs and tightening against the same.

4. In a vulcanizing device for side walls of tire casings, a circular matrix for one side wall of the casing, a matrix heating means, means for removably securing the tire casing in the matrix, tire tread restraining means, means for applying pressure against the side wall of the casing opposite the matrix, said last means comprising an annular member resting on the side wall of the casing opposite the matrix, a spider resting on the annular member, said spider including a central hub, a shaft securely anchored to said heating means and passing through said central hub, said hub being slotted to permit the spider to be transversely slidable with respect to the shaft, and a screw member threadedly engaging the shaft and adapted to force said spider and annular member downwardly against the side wall opposite the matrix.

KENNETH G. VANIMAN.